United States Patent Office 3,291,599
Patented Dec. 13, 1966

3,291,599
CHEMICAL PROCESS
James W. Reeves, Wilmington, Del., assignor to E. I. du Pont de Nemours and Company, Wilmington, Del., a corporation of Delaware
No Drawing. Filed Apr. 29, 1964, Ser. No. 363,581
13 Claims. (Cl. 75—103)

This invention relates to the treatment of ferrotitaniferous materials to increase their titanium concentration and, more particularly, to a process wherein iron is removed from titaniferous materials such as ilmenite.

Titaniferous ores, used as a raw material in the production of titanium substances, contain numerous other metallic constituents, the major one being iron. For most of the commercial ilmenites, a principal type of ore, by weight, the iron content is between 30 and 80% of the $TiO_2$ content, the $TiO_2$ ranging between 30 and 65% and the iron between 20 and 40%. Since only minor amounts of iron can be tolerated in products prepared from these ores, such as pigmentary titanium dioxide and titanium metal, considerable emphasis has been placed on economic procedures for its removal. Many of the commercial ilmenites have been subjected to various ore dressing operations to increase the $TiO_2$ conecentration and the concentrations so obtained represent the highest that can be practically achieved by such methods. Higher $TiO_2$ concentrations can be obtained only by chemical treatments.

In the prior art various methods of chemical treatment have been used to extract the iron contained in titanium bearing ores. Preferential extraction of the iron contained in the ores in the form of oxides has been achieved by the use of various acids to form soluble iron salts or the use of halogenating gases such as HCl or chlorine to render volatile iron halides. Other procedures include the roasting of the ferrotitaniferous ores either in oxidizing or reducing atmospheres to convert the iron into a form that enables it to be more readily extracted from the ore by dilute acids or solutions of salts or other reagents. These processes have not proven to be wholly economic due to the comparatively high cost of the consumed reagents and the investment required for such operations. Other processes such as the electromagnetic separation of iron from ores have also proven to be economically unattractive.

The objects of this invention are to provide (other objects of this invention will become apparent from the subsequent disclosure and claims):

(1) A process for altering weathered and unweathered ilmenite and related ores to rutile and hematite phases, (2) A process for reducing weathered titaniferous ores to metallic iron and rutile, (3) A chemical leaching process for removal of iron from ferrotitaniferous ores which utilizes an aqueous ammonia carbonate solution, (4) A cyclic process for the removal of iron from titaniferous ores; and (5) An economic cyclic process for removing iron from ferrotitaniferous material by oxidizing, reducing, then chemically leaching the freshly formed ferrous iron with aqueous ammonia-carbonate solutions wherein the leaching agents are recovered and recycled for reuse.

The objects of this invention are accomplished by a process which broadly comprises reducing all the iron to the metallic state, oxidizing the metallic iron to the ferrous state in the presence of an aqueous ammonia-ammonium carbonate solution to form a soluble ferrous complex, further oxidizing the ferrous complex to form a precipitate of hydrated ferric oxide as a second and distinct solid phase and separating the ferric oxide from the residual titanium dioxide concentrate. After the selective oxidation of the ore and the reduction of iron to the metallic state, the additional process steps of the invention can be further described as (1) converting the metallic iron contained in the ore particles to hydrated ferric oxide as a second and distinct solid phase by agitating the reduced ore in the presence of an oxidizing agent in an aqueous solution containing, by weight, 5 to 30% ammonia and 3 to 25% $CO_2$ to form a solids concentration up to 30%, maintaining the pressure at an optimum value dependent upon the operating temperature, (2) separating the resultant titanium dioxide concentrate from the hydrated ferric oxide by virtue of the differences in their densities and particle sizes and (3) recovering the ammonia and carbon dioxide contained in the leach liquor associated with the $TiO_2$ beneficiate and hydrated ferric oxide and recycling them for use in further leaching.

Although ferrous oxide is dissolved by the ammonia-ammonium carbonate leach liquor, the ferrous iron found in commercial ilmenites or obtained by the reaction of ferric oxide former by weathering of ilmenite cannot be dissolved as it is mostly present as ilmenite, ferrous titanate. To form the soluble ferrous complex it is necessary to reduce the iron to the metallic state and reoxidize it to the ferrous state in the controlled leach.

As described in U.S. Patent 2,339,808, the conversion of the iron to the metallic state can be carried out by roasting the ore at a temperature of from 700° C. to 1000° C. in a reducing atmosphere. Suitable reductants are gaseous hydrogen, carbon monoxide, coal gas or water or solid carbonaceous matters such as coke. After reduction the ore is cooled down in such a manner that any reoxidation of the iron is avoided and the reduced material is not subjected to changes which render it less reactive during the subsequent oxidation process.

Controlled air roasting of ferrotitaniferous ores such as ilmenite has been found to improve the reduction kinetics and equilibrium and also the rate and degree of iron removal during leaching. This converts both unaltered ilmenite as well as the weathered amorphous ilmenite to distinct hematite and rutile phases. In a preferred embodiment of this invention, ilmenite is artificially weathered by roasting the ore at temperatures of 600° C. to 1000° C. in air or oxygen containing gases for periods of 30 to 60 minutes. A rotary kiln or fluidized bed reactor containing an oxidizing atmosphere is suitable. If the temperature is permitted to exceed 1000° C. a difficultly reducible titaniate (pseudobrookite) will form. The rate of the reaction is very low below 600° C. After 45 minutes at 800° C. ilmenite will be nearly 100% converted to $Fe_2O_3$ or $TiO_2$.

Direct reduction of ores is commonly practiced by carbon reduction in a rotary kiln or by fluidized reduction with reducing gases. Severe capacity limitations are imposed upon these reactors when using an ore difficult to reduce, such as ilmenite, however, This invention provides three methods for raising capacity in ferrotitaniferrous reduction.

One method of increasing the productivity of a fluidized reduction furnace is to minimize consumption of reducing gases by countercurrent operation. This procedure is made possible by the ilmenite reduction equilibrium. During reduction with hydrogen, the $Fe_2O_3$ reduces to FeO and forms $FeO \cdot TiO_2$ as shown in reaction (1) of Table I below. $FeO \cdot TiO_2$ then reduces non-stoichiometrically to metallic iron as shown in reactions (2) and (3). Inspection of the equilibrium constants for these at 1000° C. shows a more powerful reducing gas is required to reduce the lower oxides rather than the higher oxides. Thus, the equilibrium off-gas from reaction (3) is still strongly reducing with respect to reaction (2) and the same relationship holds for reactions (2) and (1):

TABLE I

Kp at 1000° C.
(1) $\frac{1}{2}Fe_2O_3 + TiO_2 + \frac{1}{2}H_2 = FeO \cdot TiO_2 + \frac{1}{2}H_2O$ -- 3
(2) $FeO \cdot TiO_2 + \frac{1}{2}H_2 = \frac{1}{2}FeO \cdot 2TiO_2 + \frac{1}{2}Fe + \frac{1}{2}H_2O$ ---------------------------------- 0.09
(3) $FeO \cdot 2TiO_2 + \frac{1}{5}H_2 = \frac{1}{5}FeO \cdot 10TiO_2 + \frac{4}{5}Fe + \frac{4}{5}H_2O$ ---------------------------------- 0.05

Countercurrent operation may be achieved by the use of a multicompartment fluidized furnace. Ore preheated to 800°–1200° C. is fed countercurrent to hydrogen preheated to 800°–1100° C. The most difficult to reduce oxide is brought into contact with hydrogen, equilibrium is attained, and the off-gases pass upward to the next stages, equilibrating with the solids and finally leaving the furnace. The number of reduction stages, the reduction temperature and pressure are a function of the ore used and must be optimized in each instance. A three-stage furnace operating at 800°–1200° C. and 1 to 10 atmospheres pressure is applicable for most applications; but, for a weathered Florida ilmenite, 1000° C. and 4 to 6 atmospheres is preferred.

Another method applies to higher productivity from rotary kilns without sticking the charge. Kiln capacity is normally limited by the rate of heat transfer from the combustion gases to the charge, which in turn is limited by the temperature difference. Capacity is further limited by the combustion gas composition since some reoxidation of the reduced ore occurs. A smaller temperature difference and a reducing combustion gas is necessary during the final 25 to 50% of reduction because of the increased tendency to stick. Because this severly limits kiln capacity, this final reduction is best accomplished in a fluid bed by a reducing gas such as hydrogen, carbon monoxide, or mixtures thereof. An economic process can be accomplished by using coke as the reducing agent in the kiln while partially oxidized natural gas is used to complete the reduction in a fluidized bed reactor. For this combination of reactors and reducing agents, the rotary kiln should operate at 1100° to 1200° C. with 10 to 50% coke or carbon in the ore mixture. Any commercially available carbon source is operable but coke is the most economic. The fluid bed should operate at 900° to 1100° C. using a reducing gas mixture preheated to 700° to 1100° C. Additionally, a preheated gas such as that formed by burning natural gas to form a hot mixture of carbon monoxide, nitrogen and hydrogen is quite satisfactory. The fluidized reactor must operate at a temperature high enough to give improved reductant gas utilization by regeneration with coke. The minimum temperature at which this is accomplished is 900° C. while 1000° to 1050° C. is the preferred range for ilmenite. This can be achieved by feeding pre-reduced ore heated to 1100° C. or more while also feeding reductant gases preheated to 700° C.–1100° C.

The third method for reducing ilmenite has great economic importance, especially in geographical areas where electrical power is plentiful. The entire reduction is accomplished in a fluid bed containing carbon and using a minimum of fluidizing gas, the process being made possible by adding sufficient heat for the endothermic carbon reactions from electrodes immersed in the bed. The temperature of the electrically heated fluidized bed must be 900° C. to 1300° C. with the ore being ground to 40–100 mesh and mixed with 10 to 50% coke or carbon in the ore mixture. Also, while any active carbon is operable, coke is the most economic. The superficial gas velocity, which is dependent upon the density of gas and ore mixture employed, should be sufficient to maintain fluidization. While the fluidizing reducing gas can be selected from hydrogen, reformer gas and partially oxidized natural gas, for example, it should not contain great quantities of diluents such as nitrogen which ultimately decrease reactor capacity. The preferred preheat temperature for said fluidizing reducing gas is 100° C. to 1200° C., the remainder of the heat needed to compensate the endothermic reaction between reducing agents and ferric oxide being most economically supplied by electrical heating. Ore sintering around the electrical heaters is prevented by maintaining a low temperature differential between the heaters and the bed, maintaining the lowest practical bed temperature, using heaters with the largest possible surface area to prevent the heater skin temperature from becoming excessive and bed dilution with coke. The economic attractiveness of this reduction method results from the fact that most of the iron reduction is accomplished by the carbon while only a small amount of reducing gas is needed to maintain fluidization. Since gas which oxidizes the ore will liberate heat causing local overheating and leads to bed sticking, the reduction capacity of the fluidization gas must be such that ore which has had 95% of its iron completely reduced will be continued to be reduced by the gas.

In a preferred embodiment of this invention the cooled, reduced ore containing elemental iron is suspended in an aqueous solution of ammonia-carbon dioxide through which oxygen gas is bubbled. As was previously mentioned, it is important that the iron be in contact with the leach liquor when it is oxidized to the ferrous state so the soluble ferrous complex forms before further oxidation can occur since the products of further oxidation are not soluble in the leach liquor. It is theorized and data indicate that for a given ore at a given leach temperature an optimum oxygen pressure exists which allows virtually complete extraction of the iron at the fastest rate. Below this pressure the low oxygen concentration at the interface limits the rate and above this pressure the high oxygen concentration at the interface results in the formation of insoluble hydrated ferric oxide in the pores of the ore particles which reduces the rate until the iron extraction virtually stops. Thus, single optimum values of the operating variables cannot be stated as they are functions of such factors as the type of ore being used, the reduction procedures being used, the economically optimum operating temperature and the oxygen concentration in the gas, the type of equipment being used. For example, when using pure oxygen with various ores, iron extractions have been obtained over a temperature range of 20 to 80° C., pressures of 2 to 55 p.s.i.g., ammonia concentrations from 5 to 20%, carbon dioxide concentrations of 1.5 to 18%, ammonia to $CO_2$ ratios of 1:1 to 5:1 and solids concentrations up to 30 weight percent. If air is used in place of pure oxygen, the optimum operating pressures are increased. The preceding values are not intended to be limiting but merely indicative of the wide ranges that may be used and still obtain satisfactory extractions.

For optimum results a minor amount of reducing agent, particularly ammonium sulfide, should be present during the leach. Ammonium sulfide in the range of 0.05 to 0.20%, by weight, of the ore is preferred, but larger amounts are not objectionable. This has resulted in higher rates and extent of iron extraction. The theoretical reason for this is uncertain but the ammonium sulfide may reactivate a passive oxide layer formed on the ore particles by trace amounts of oxygen or water in the inert atmosphere used in cooling the reduced ore or found during the quick transfer in air of the cooled reduced ore to the leach vessel. Thus, the advantages gained by the use of ammonium sulfide may be later eliminated by the better cooling and ore handling techniques made possible by larger scale, continuous operation.

On an industrial scale the leach may be carried out in various types of equipment, the only requirement being that the agitation be sufficient to suspend the ore particles in the leach liquor and yield satisfactory mass transfer rates in the absorption of the oxygen in the leach liquor, the dissoltuion of the iron and removal of the soluble ferrous complex from the ore particles. Suitable equipment include aeration towers, staged or non-staged, with or without mechanical agitation; Pachuca tanks; turbo-absorbers and tumbling mixers, which may be operated either batchwise or continuous.

The leached ore, hydrated ferric oxide and leach liquor can be separated from each other by any of various solid-liquid separation methods. One suitable procedure is the following. The hydrated ferric oxide, being of a lower density and particle size than the leached ore, is removed in the overflow and the leached ore, free of ferric oxide, in the underflow of a continuous elutriator. The underflow is sent to a rotary filter where the leached ore is separated from and water washed of the contained leach liquor. The ore is dried to yield a final, free-flowing product. The overflow from the elutriator is sent to thickeners to concentrate the hydrated ferric oxide while the clarified overflow liquor is recycled to the leach. The underflow from the thickeners and the filtrate and wash water from the rotary filter is sent to a steam distillation tower where the ammonia and carbon dioxide are stripped from the ferric oxide, absorbed in water and recycled to the leach. The tower bottoms, a slurry of hydrated ferric oxide in water is sent to settling basins for the recovery of the solids. The ferric oxide is recovered is of 95% or greater purity. Generally, the impurities are $Al_2O_3$, $SiO_2$, CaO and MgO, which are released from the iron phase during leaching, along with a minor amount of fine titanium dioxide particles. This product is extremely useful and, as processed, can be utilized as a feed material for producing high grade iron ore sinter. Also, the oxide may be employed as a hydrous iron oxide pigment. Additional processing may be necessary to remove oversize particles and to apply a dispersing agent. Other possibilities include reducing to high grade iron for powder metallurgical uses and, after classification to remove large impurities, a chemically pure grade would be suitable for production of ferrites. Again, it should be emphasized that the preceding is just one of many alternate ways by which the invention can be carried out on an industrial scale.

For a clearer understanding of the invention, the following specific examples are given. These examples are intended to be merely illustrative of the invention and not in limitation thereof. Unless otherwise specificed, all parts are by weight.

*Example I*

A gas fired rotary kiln is used to reduce an ore of 40–200 mesh size having 64.0% $TiO_2$, 3.5% FeO and 26.0% $Fe_2O_3$ with −6 mesh coke feed to equal 40% of the charge. The ore is heated to 1200° C. and is retained in the kiln at this temperature for one hour to achieve 75% metallization, after which it discharges to a hopper from which it is conveyed to the fluidized reduction furnace. The ore is fluidized with 1000° C. patrially oxidized natural gas which is made by burning 600° C. methane and 1000° C. air in the fluidized bed. The fluidized bed operates at 1000° to 1050° C. under these conditions at a gas velocity of 1.0 to 1.5 ft./sec. The carbon reactivity is sufficient to account for ¾ of the reduction by reaction with the $H_2O$ and $CO_2$. This gives a furnace exit gas of 35.3% $H_2$, 1.4% $H_2O$, 25.2% CO, 1.0% $CO_2$ and 38.1% $N_2$. The gas/solid feed rate ratio to give a final 95% metallized ore gives enough by-product gas to supply 80% of the kiln heat under these operation conditions.

*Example II*

A mixture of 70%, 40 mesh ilmenite and 30% −6 mesh coke is preheated to 1100° C. and fed to a fluidized reactor. The fluidizing gas is 1000° C. partially oxidized methane which analyzes approximately 40% $H_2$, 20% CO and 40% $N_2$. A superficial velocity of 1.5 ft./sec. is maintained in the reactor, which is operated isothermally at 1000° C. by supplying heat from electrical resistors submerged in the bed. The exit gas contains 5% $CO_2+H_2O$ (excluding $N_2$) and is the equilibrium composition for the 95% metallized ore product. Ninety percent of the reductant is carbon and the remaining 10% is the fluidizing gas.

*Example III*

A series of extractions were performed on 50 gm. portions of the various ores listed in Table 2:

TABLE 2.—ANALYSIS OF COMMERCIAL ILMENITES

| Sample | Ilmenite Source | Percent $TiO_2$ | Percent Fe | Percent FeO | Percent $Fe_2O_3$ |
|---|---|---|---|---|---|
| A | Trail Ridge, Fla | 64.8 | 20.5 | 4.5 | 24.4 |
| B | Western Australia | 54.9 | 30.6 | 24.4 | 16.8 |
| C | Adirondak, N.Y | 45.6 | 32.8 | 38.5 | 4.2 |
| D | Allard Lake, Quebec | 36.3 | 41.4 | 33.3 | 22.4 |
| E | Jacksonville, Fla | 60.4 | 23.5 | 9.8 | 22.7 |

Each sample was placed in a tube furnace and reduced in a stream of hydrogen for a period of one hour at 1000° C., then cooled to 25° C. in a nitrogen atmosphere. The degree of iron conversion for each ore was measured by its loss in weight, yielding the results listed in Table 3:

TABLE 3.—ANALYSIS OF REDUCED ORES LISTED IN TABLE 2

Sample:                 Percent conversion
A _____ 95
B _____ 94
C _____ 92
D _____ 93
E _____ 95

Each of the cooled, reduced ores was transferred to a one liter flat bottom flask containing 250 mls. of stock ammonia-carbonate solution and stoppered, the stock ammonia carbonate solution being made by absorbing ammonia and carbon dioxide gases in water until each of their concentrations was 15%. Each flask, equipped with oxygen inlet tubes, was attached to a wrist action shaker and agitated for about two hours under a total pressure of 5 cm. Hg gage at room temperature. The leached ore particles were separated from the leach liquor and the ferric oxide suspension by filtration through a 325 mesh screen. Each portion was washed with one liter of water prior to drying. The analyses of the extracted ores are listed in Table 4:

TABLE 4.—EXTRACTION OF ILMENITE ORE

Sample:                 Percent iron removal
A _____ 91
B _____ 90
C _____ 90
D _____ 90
E _____ 92

*Example IV*

This example demonstrates the effect of leach temperature and pressure on iron extraction. Ten gram samples of Trail Ridge ilmenite (Sample A, Table 2) were reduced by hydrogen in a tube furnace for one hour at 900° C., then cooled to 25° C. in a nitrogen atmosphere. Each was transferred to a 250 ml. stainless steel pressure container containing 100 mls. of leach liquor, with a concentration of about 12% ammonia, 3% carbon dioxide and 0.01 gram ammonium sulfide, and 150 mls. of oxygen gas. Cylinder oxygen was added to maintain a constant pressure during the leach and the temperature was controlled by placing the container in a water bath. Agitation was provided by a laboratory wrist action shaker. Percent iron extractions for 30 minute leaches at the various pressures and temperatures were as found in Table 5:

TABLE 5

| Pressure, p.s.i.g. | Percent Fe 40° C. | Extracted at— | |
|---|---|---|---|
| | | 60° C. | 80° C. |
| 2.4 | 82 | | |
| 5 | 84 | 46 | |
| 10 | 94 | 68 | |
| 20 | 80 | 88 | |
| 40 | | 70 | 86 |
| 55 | | 72 | 82 |

*Example V*

This example shows the effect of ammonia and carbon dioxide concentration on iron extraction. 10 gram samples of Western Australian ilmenite (Sample B, Table 2) were reduced and leached as in Example III, except the leaches were made at 25° C. and 12 cm. Hg gage pressure at various leach liquor concentrations. Results illustrating the wide range of permissible $CO_2$ and $NH_3$ concentrations are shown in Table 6:

TABLE 6.—LEACH LIQUOR CONCENTRATION

| Percent $CO_2$ | Percent $NH_3$ | Percent Iron Extracted |
|---|---|---|
| 1.8 | 8.6 | 53 |
| 2.1 | 9.3 | 69 |
| 2.7 | 12.1 | 81 |
| 2.7 | 5.2 | 45 |
| 4.6 | 8.9 | 77 |
| 9.3 | 9.5 | 79 |
| 11.8 | 12.1 | 70 |
| 15.4 | 15.8 | 47 |

*Example VI*

1000 pounds of Trail Ridge ilmenite, hydrogen reduced at 1000° C. at 2 atmospheres pressure, was leached in a Pachuca tank containing 600 gallons of leach liquor. The aqueous leach liquor contained 13% ammonia, 3% carbon dioxide and one pound of ammonium sulfide. The temperature was 40 to 50° C. and the pressure was held at 20 p.s.i.g. Oxygen was added at the base of the tank to agitate the contents of the tank and oxidize the iron to hydrated ferric oxide. After one hour of leaching the slurry was pumped to a continuous elutriator to separate the ferric oxide and leached ore. The ferric oxide free beneficiate from the bottom of the elutriator was filtered and washed free of leach liquor and dried in a rotary drier. Analytical results showed 91% of the iron was extracted.

In general, this invention provides an economic chemical process for the substantial removal of iron from ferrotitaniferous ores which was not heretofore possible. More specifically, the regeneration of the ammonia and carbon dioxide to form fresh, aqueous solution makes possible an economic cyclic process for iron removal.

Since it is obvious that many changes and modifications can be made in the above-described details and that the invention is applicable to all types of ferrotitaniferous ores and not only to those specifically designated as ilmenites without departing from the nature and spirit of the invention, it is to be understood that the invention is not to be limited to said details except as set forth in the appended claims.

The invention claimed is:

1. The process for removing iron from ferrotitaniferous ores to form a titanium dioxide concentrate in the leached ore which comprises reducing the iron contained in said ferrotitaniferous ores to the metallic state, oxidizing said iron in the presence of a leach liquor of an aqueous ammonia-ammonium carbonate solution to form a soluble ferrous complex, further oxidizing said ferrous complex to form hydrated ferric oxide as a distinct solid phase, separating said leached ore from said hydrated ferric oxide and said leach liquor and thereafter recovering said titanium dioxide concentrate.

2. The process for removing iron from ferrotitaniferous ores to form a titanium dioxide concentrate in the leached ore which comprises reducing the iron contained in said ferrotitaniferous ores to the metallic state, oxidizing said iron in the presence of a leach liquor of an aqueous ammonia-ammonium carbonate solution containing a minor amount of ammonium sulfide to form a soluble ferrous complex, further oxidizing said ferrous complex to form hydrated ferric oxide as a distinct solid phase, separating said leached ore from said hydrated ferric oxide and said leach liquor and thereafter recovering said titanium dioxide concentrate.

3. The process for removing iron from ferrotitaniferous ores to recover ferric oxide and to form a titanium dioxide concentrate in the leached ore which comprises reducing the iron contained in said ferrotitaniferous ores to the metallic state, oxidizing said iron in the presence of a leach liquor of an aqueous ammonia-ammonium carbonate solution to form a soluble ferrous complex, further oxidizing said ferrous complex to form hydrated ferric oxide as a distinct solid phase, separating said leached ore from said hydrated ferric oxide, recovering ferric oxide from said hydrated ferric oxide and thereafter recovering said titanium dioxide concentrate.

4. The process for removing iron from ferrotitaniferous ores to form a titanium dioxide concentrate in the leached ore which comprises artificially weathering said ferrotitaniferous ores at from about 600° C. to about 1000° C. in an oxygen-containing atmosphere, reducing the iron contained in said ferrotitaniferous ores to the metallic state, oxidizing said iron to hydrated ferric oxide in the presence of a leach liquor, at from about 20° C. to about 80° C., of an aqueous solution containing, by weight, from about 5 to about 20% ammonia and from about 1.5 to about 18% carbon dioxide, separating said leached ore from said hydrated ferric oxide and said leach liquor and thereafter recovering said titanium dioxide concentrate.

5. The process of claim 4 wherein reducing the iron contained in said ferrotitaniferous ores to the metallic state comprises passing said ferrotitaniferous ores, preheated to from about 800° C. to about 1200° C., countercurrently to a hydrogen fluidizing gas preheated to from about 800° C. to about 1100° C. in a three-stage fluidized furnace maintained at from about 800° C. to about 1200° C. and at from 1 to 10 atmospheres pressure.

6. The process of claim 4 wherein reducing the iron contained in said ferrotitaniferous ores to the metallic state comprises charging a rotary kiln maintained at from about 1100° C. to about 1200° C. with a ferrotitaniferous ore mixture containing, by weight, from about 10 to about 50% coke, conducting said reducing step until no more than 75% of said iron is reduced to the metallic state and thereafter completing said reducing step in a fluidized bed reactor heated to from about 900° C. to about 1100° C. by passing a reducing gas countercurrently to said ferrotitaniferous ore mixture, said reducing gas being a member selected from the group consisting of hydrogen, water gas, partially-oxidized natural gas and mixtures thereof.

The process of claim 4 wherein reducing the iron contained in said ferrotitaniferous ores to the metallic state comprises charging an electrically heated fluidized bed maintained at from about 900° C. to about 1300° C. with a ferrotitaniferous ore mixture containing, by weight, from about 10 to about 50% carbon, and thereafter carrying out said reducing step in the presence of a fluidizing gas maintained in sufficient quantities and at sufficient superficial velocities to maintain fluidization, said fluidizing gas being a member selected from the group consisting of hydrogen, water gas, partially-oxidized natural gas and mixtures thereof.

8. The cyclic process for removing iron from ferrotitaniferous ores to form a titanium dioxide concentrate in the leached ore which comprises reducing the iron contained in said ferrotitaniferous ores to the metallic state, oxidizing said iron in the presence of a leach liquor of an aqueous ammonia-ammonium carbonate solution to form a soluble ferrous complex, further oxidizing said ferrous complex to form hydrated ferric oxide as a distinct solid phase, separating said leached ore from said leach liquor containing said hydrated ferric oxide, recovering said titanium dioxide concentrate, treating said leach liquor to remove the ammonia and carbon dioxide and thereafter recycling said ammonia and said carbon dioxide to form fresh leach liquor.

9. The cyclic process of claim 8 wherein said leach liquor contains a minor amount of ammonium sulfide.

10. The cyclic process for removing iron from ferrotitaniferous ores to recover ferric oxide and to form a titanium dioxide concentrate in the leached ore which comprises reducing the iron contained in said ferrotitaniferous ores to the metallic state, oxidizing said iron in the presence of a leach liquor of an aqueous ammonia-ammonium carbonate solution to form a soluble ferrous complex, further oxidizing said ferrous complex to form hydrated ferric oxide as a distinct solid phase, separating said leached ore from said leach liquor containing said hydrated ferric oxide, recovering ferric oxide from said leach liquor containing said hydrated ferric oxide, recovering said titanium dioxide concentrate, treating said leach liquor to remove the ammonia and carbon dioxide and thereafter recycling said ammonia and said carbon dioxide to form fresh leach liquor.

11. A process for reducing iron contained in ferrotitaniferous ores to the metallic state which comprises placing said ferrotitaniferous ores in a three-stage fluidized bed heated to 800° C. to 1200° C. and at 1 to 10 atmospheres pressure and passing hydrogen preheated to 800° C. to 1100° C. countercurrently until said iron is reduced to the metallic state.

12. A process for reducing iron contained in said ferrotitaniferous ores to the metallic state which comprises charging a rotary kiln maintained at from about 1100° C. to about 1200° C. with a ferrotitaniferous ore mixture containing, by weight, from about 10 to about 50% coke, conducting the reduction until no more than 75% of said iron is reduced to the metallic state and thereafter completing said reduction in a fluidized bed reactor heated to from about 900° C. to about 1100° C. by passing a reducing gas countercurrently to said ferrotitaniferous ore mixture, said reducing gas being a member selected from the group consisting of hydrogen, water gas, partially-oxidized natural gas and mixtures thereof.

13. A process for reducing iron contained in ferrotitaniferous ores to the metallic state which comprises charging an electrically heated fluidized bed maintained at from about 900° C. to about 1300° C. with a ferrotitaniferous ore mixture containing, by weight, from about 10 to about 50% carbon, and thereafter carrying out the reduction in the presence of a fluidizing gas maintained in sufficient quantities and at sufficient superficial velocities to maintain fluidization, said fluidizing gas being a member selected from the group consisting of hydrogen, water gas, partially-oxidized natural gas and mixtures thereof.

References Cited by the Examiner

UNITED STATES PATENTS

| | | | |
|---|---|---|---|
| 2,478,942 | 8/1949 | Quenean et al. | 75—103 |
| 2,717,829 | 9/1955 | Dougherty | 75—103 |
| 2,864,690 | 12/1958 | Lee et al. | 75—121 |
| 2,953,424 | 9/1960 | McKinney et al. | 75—121 |
| 3,069,235 | 12/1962 | Schechter et al. | 75—121 |
| 3,099,526 | 7/1963 | Li et al. | 75—121 |
| 3,252,787 | 5/1966 | Sheah | 75—121 |

DAVID L. RECK, *Primary Examiner.*

N. F. MARKVA, *Assistant Examiner.*